Figure 1:
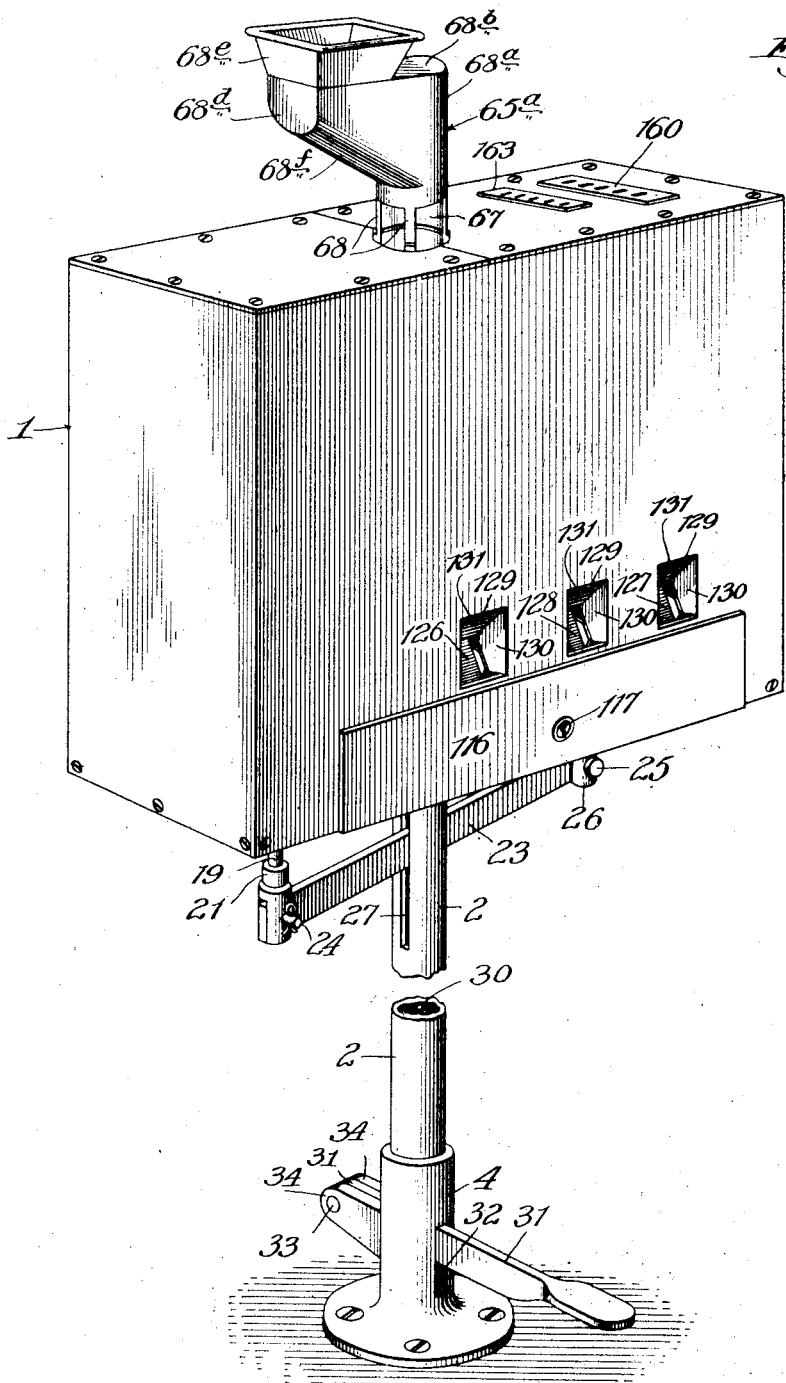

F. G. MURRAY.
FARE BOX.
APPLICATION FILED AUG. 23, 1915.

1,196,383.

Patented Aug. 29, 1916.
7 SHEETS—SHEET 1.

Witnesses:

Inventor.
Frank G. Murray,
By David H. Fletcher,
Atty.

F. G. MURRAY.
FARE BOX.
APPLICATION FILED AUG. 23, 1915.

1,196,383.

Patented Aug. 29, 1916.
7 SHEETS—SHEET 2.

F. G. MURRAY.
FARE BOX.
APPLICATION FILED AUG. 23, 1915.

1,196,383. Patented Aug. 29, 1916.
7 SHEETS—SHEET 3.

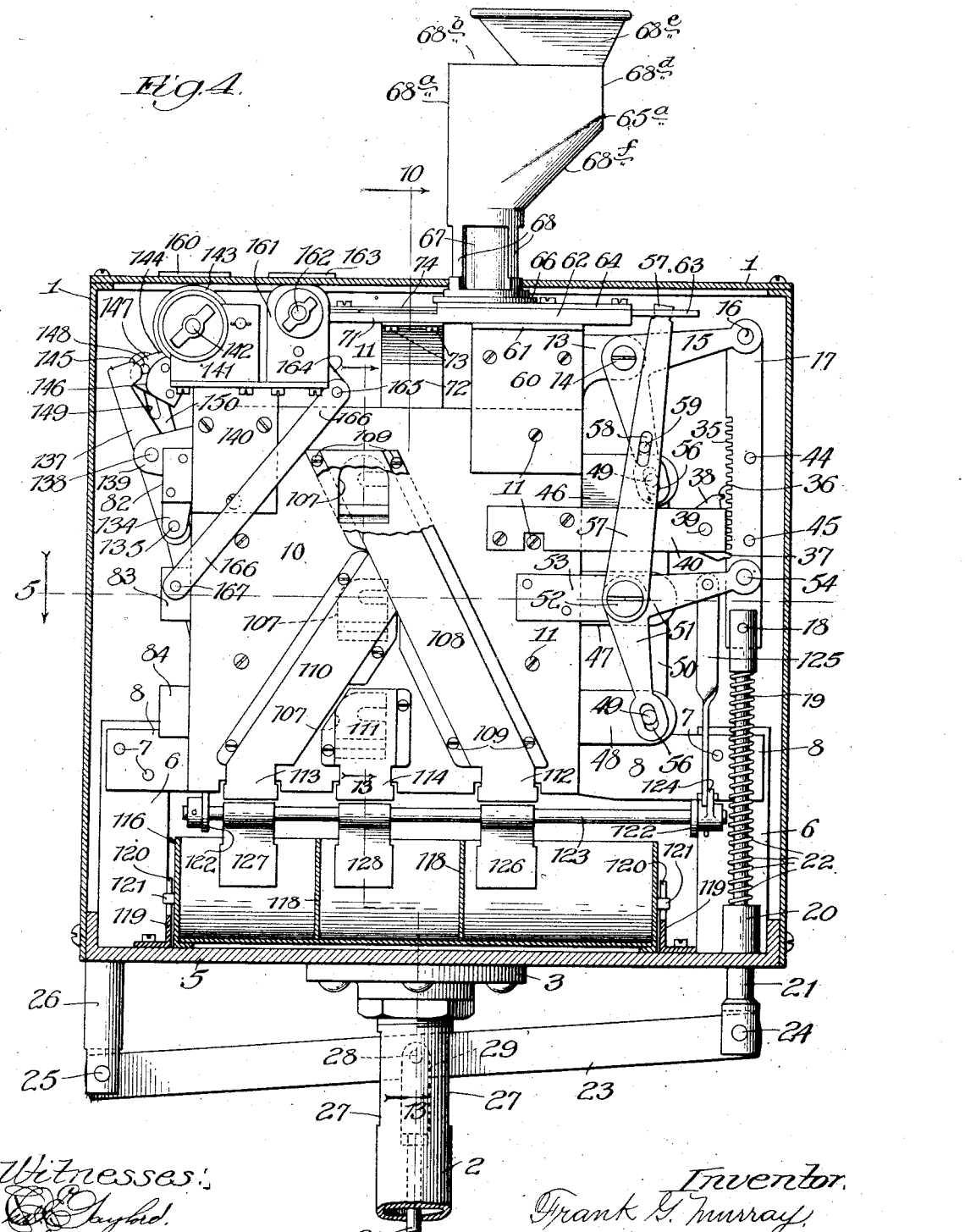

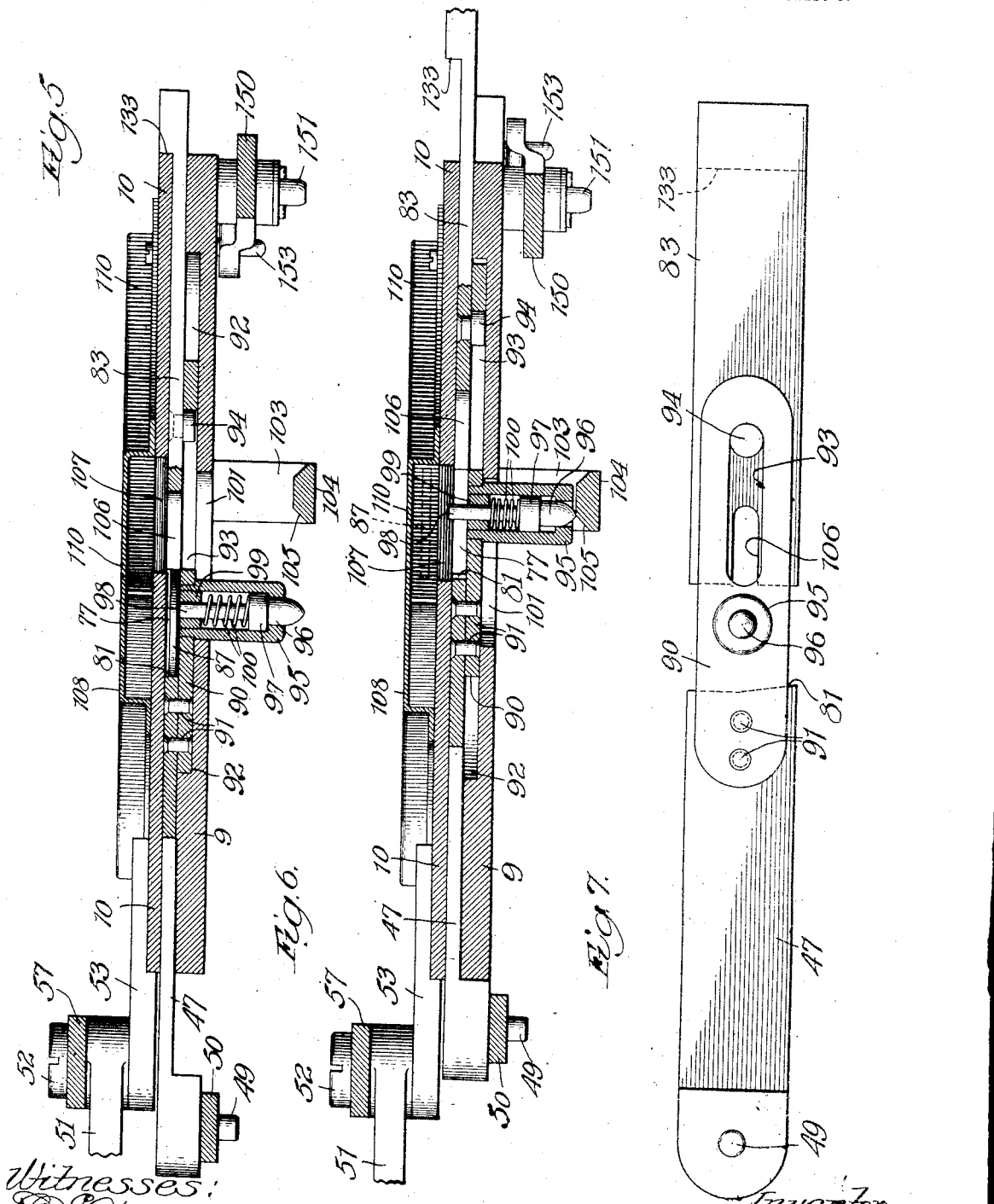

F. G. MURRAY.
FARE BOX.
APPLICATION FILED AUG. 23, 1915.
1,196,383.
Patented Aug. 29, 1916.
7 SHEETS—SHEET 6.
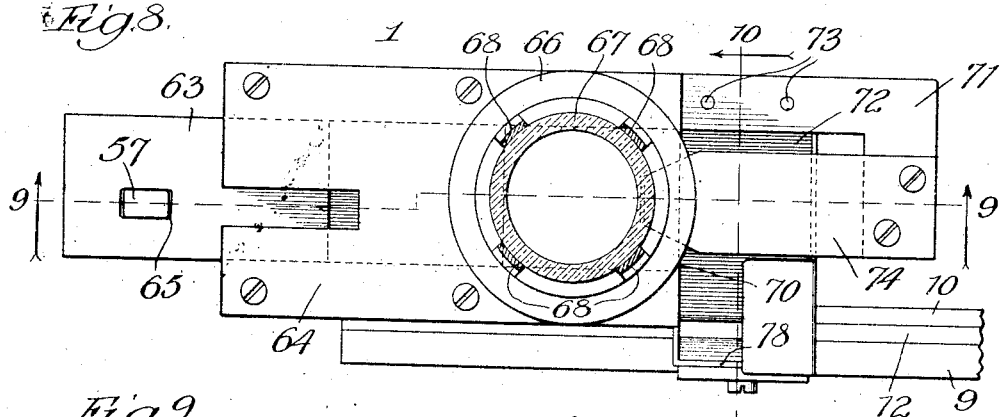
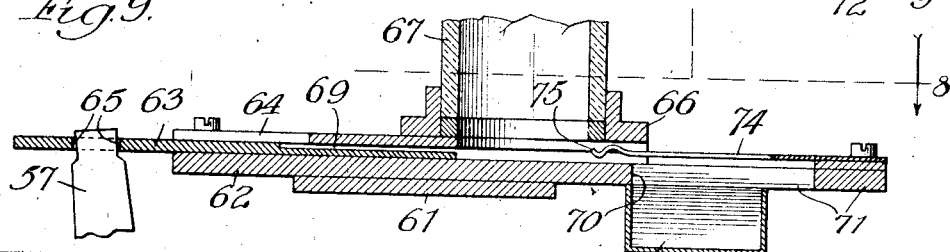
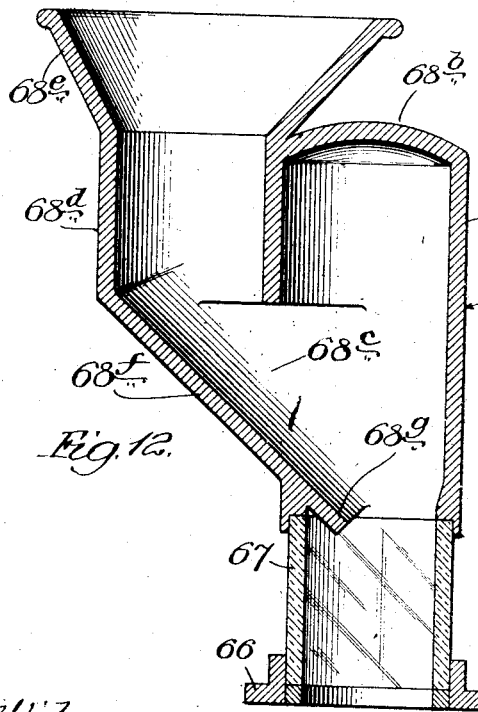
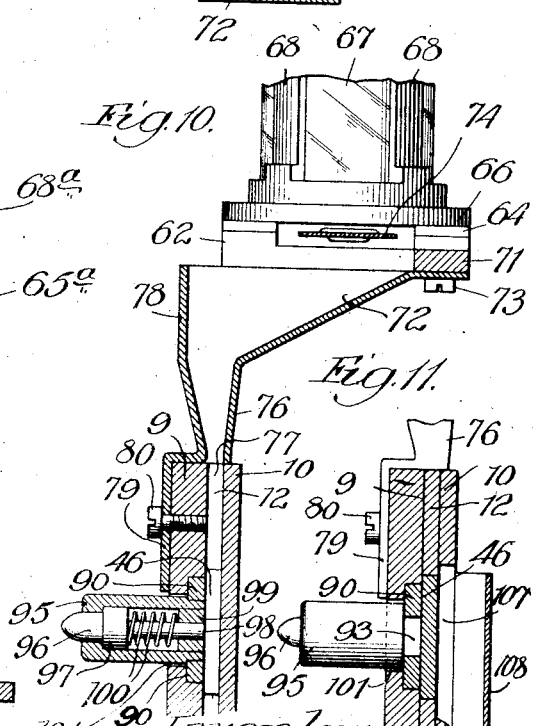
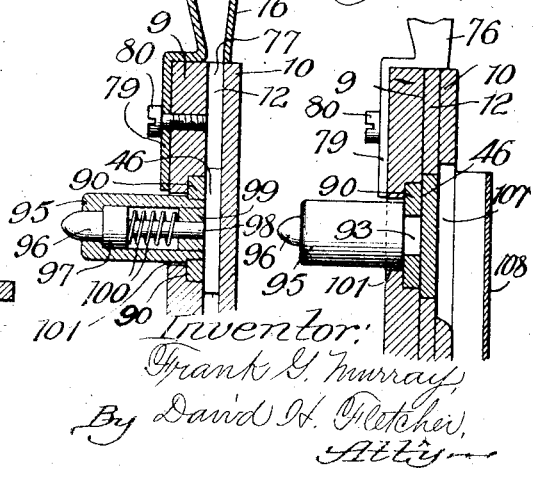
Inventor:
Frank G. Murray,
By David H. Fletcher,
Atty.
Witnesses:

F. G. MURRAY.
FARE BOX.
APPLICATION FILED AUG. 23, 1915.
1,196,383.
Patented Aug. 29, 1916.
7 SHEETS—SHEET 7.
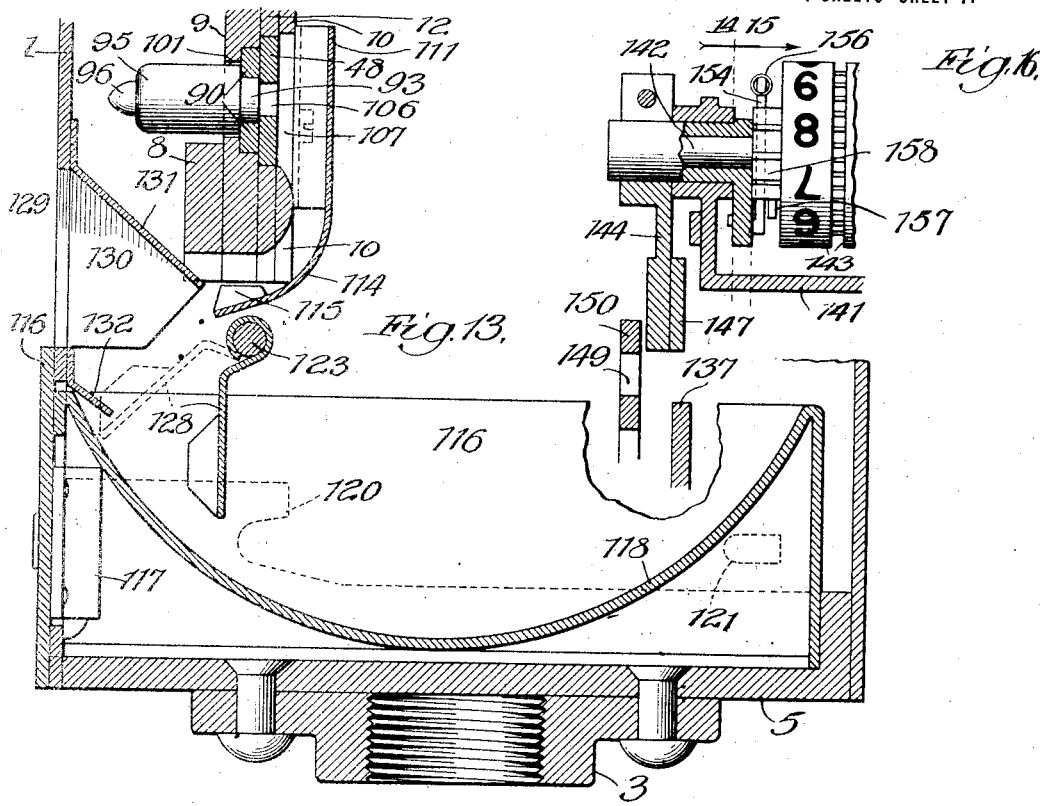
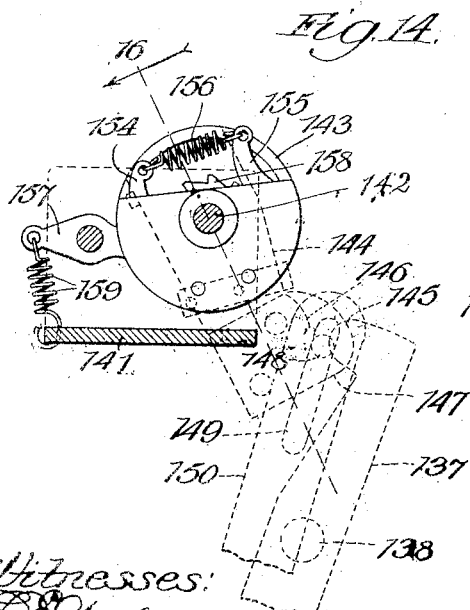
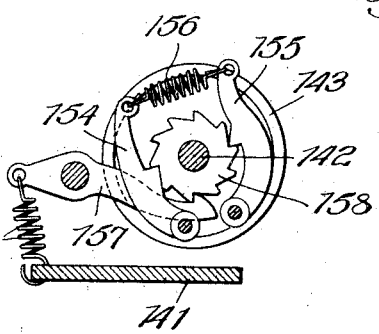
Witnesses:
Inventor:
Frank G. Murray,
By David H. Fletcher,
Atty.

UNITED STATES PATENT OFFICE.

FRANK G. MURRAY, OF CHICAGO, ILLINOIS.

FARE-BOX.

1,196,383.  Specification of Letters Patent.  Patented Aug. 29, 1916.

Application filed August 23, 1915.  Serial No. 46,915.

*To all whom it may concern:*

Be it known that I, FRANK G. MURRAY, a citizen of the United States, residing at Chicago, in the county of Cook and State of Illinois, have invented certain new and useful Improvements in Fare-Boxes, of which the following is a description, reference being had to the accompanying drawings, forming a part of this specification, in which corresponding numerals of reference in the different figures indicate like parts.

My invention relates to fare-boxes, such, for example, as those used upon street railways and for analogous purposes; my object being to provide a cheap, simple and effective device adapted to receive coin of varying denominations within a temporary receptacle so constructed as to permit its inspection while preventing removal previous to its passage to the main receptacle; to so construct said primary receptacle as to cause each coin to lie flatwise therein, one upon the other, to prevent wedging, while providing suitable means for successively removing said coins in a horizontal plane and so manipulating them as to cause them to be moved in a substantially vertical plane or upon edge, and thus conveyed one by one into contact with suitable selecting mechanism whereby coins of different relative values may be separated and registered according to their respective values.

Further objects are to provide simple means for preventing the passage at the same time of more than one thin coin or the interference by thin coins with the passage of those of normal thickness.

Again it is my purpose to provide special and effective means for the registration of the coins according to their several values and for positively insuring their successive removal after registration, from the coin channels.

Moreover, it is my purpose to provide means so located between the registering means and the final coin-receptacle, for temporarily arresting and displaying each coin and permitting its removal if necessary, so that the person depositing a coin may see it before it is finally passed into the locked receptacle, so as to enable the attendant to prove the character and denomination of the coin deposited, whether spurious or otherwise.

Figure 2:
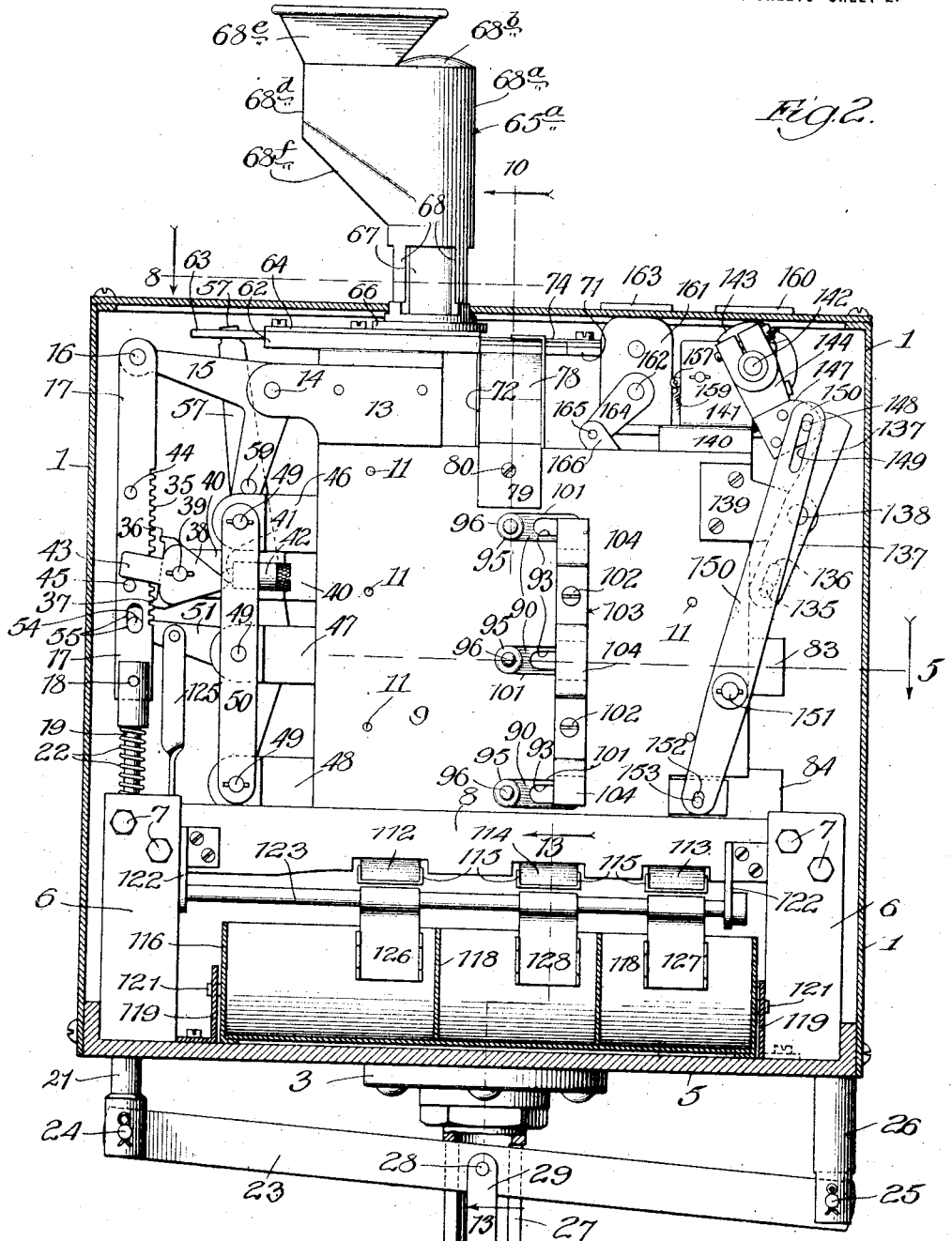
Figure 3:
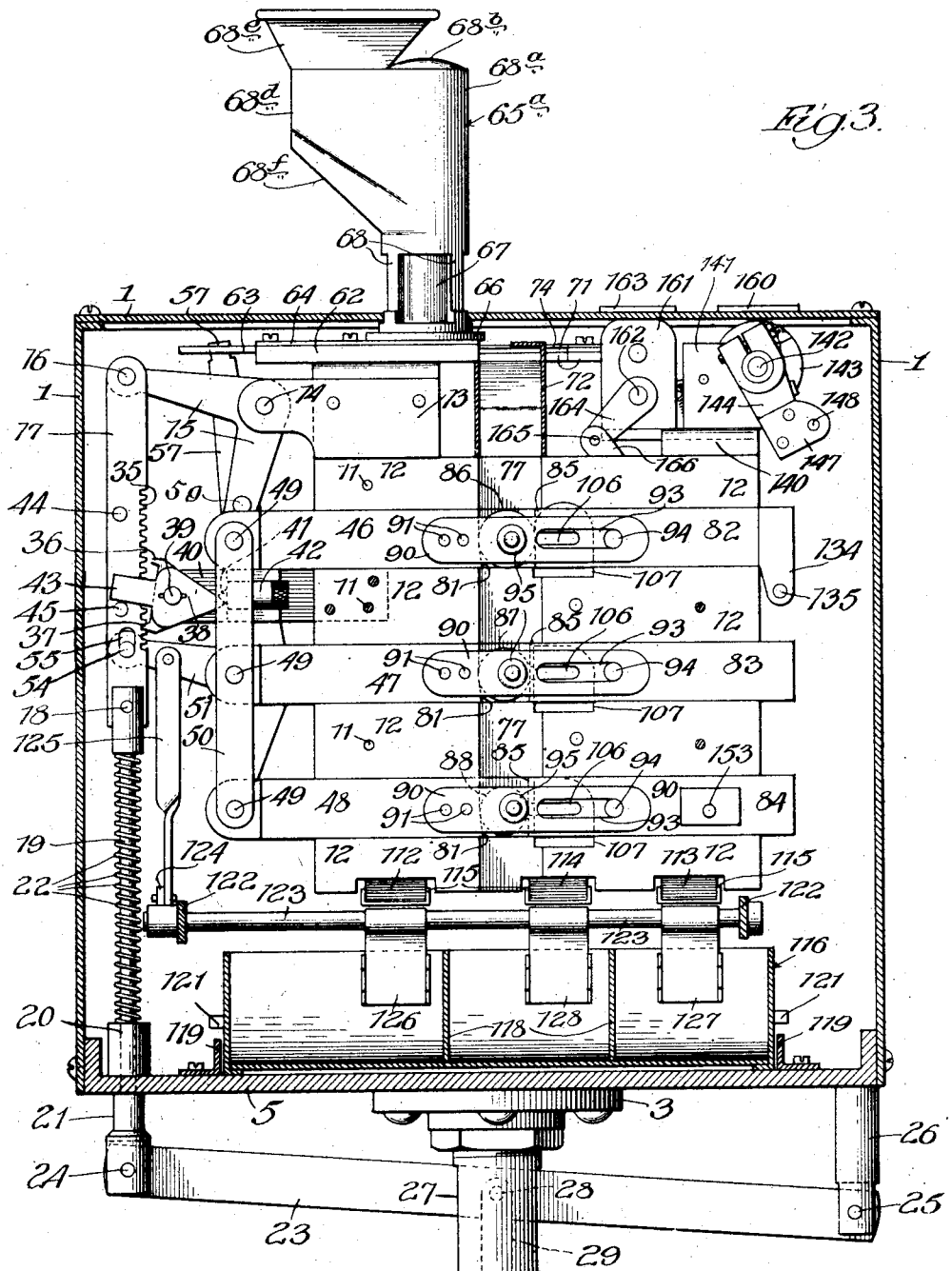

In the drawings, Figure 1, is a perspective view of a fare-box embodying the features of my invention, Fig. 2 is a longitudinal vertical sectional view through the casing and coin receptacle showing a front elevation of the interior parts, Fig. 3, is a like view of the parts as they would appear with the front frame-plate removed, Fig. 4, is a section similar to that shown in Fig. 2, viewed from the opposite side, Fig. 5, is an enlarged section in plan taken upon line 5—, Figs. 2 and 4, Fig. 6, is a like view showing the coin actuating parts in reversed positions, Fig. 7, is a front face view of one of the coin actuating slides and the knock-out pin carried thereby, Fig. 8, is a sectional view in plan taken upon the line 8—, Figs. 2 and 9 respectively, Fig. 9, is a section taken upon the line 9—9, Fig. 8, viewed in the direction of the arrow there shown, Fig. 10, is a section taken upon the line 10—, Figs. 2, 4 and 8 respectively, viewed in the direction of the arrows there shown, Fig. 11, is a section taken upon the line 11—, Fig. 4, viewed on the direction of the arrow there shown, Fig. 12, is a section taken upon line 9—, Fig. 8, viewed in the direction of the arrow there shown, Fig. 13, is a section taken upon the line 13—, Fig. 2, viewed in the direction of the arrow there shown, Fig. 14, is a section taken upon the line 14—, Fig. 16, viewed in the direction of the arrow there shown, Fig. 15, is a section taken upon the line 15—, Fig. 16, and Fig. 16, is a section taken upon the line 16—, Fig. 14, viewed in the direction of the arrow there shown.

Referring to the drawings, 1, indicates a casing preferably rectangular in form and stamped from sheet-metal. In the example illustrated said casing is represented as being supported upon a standard 2, formed from hollow tubing, the upper end of which is tapped into a boss 3 riveted to or otherwise formed upon the bottom of the casing, while the lower end is tapped into a pedestal 4, Fig. 1, rigidly attached to a floor. The purpose of said supports and the operative parts connected therewith will be explained later.

Rigidly attached to the base plate 5, of the box or casing are upwardly extending brackets or supports 6, 6, Figs. 2 and 4, to the upper ends of which is attached by means of bolts 7, a horizontal cross-bar 8. Said cross-bar serves in turn as a frame support for a metal front-plate 9, Figs. 2, 5, 6 and 13, which is, in effect, a vertical frame-plate to which most of the operative parts are connected. Parallel with, but spaced apart from the plate 9, is a similar backing plate 10, which is substantially coincident therewith and rigidly attached thereto by means of rivets or screws 11, Figs. 2, and 4, passed through intervening filling members or spacing plates 12, Figs. 3, 10, 11 and 13. Rigidly attached to the upper portion of the backing-plate 10 and extending upwardly therefrom is a bracket 13, Figs. 2, 3 and 4, to which is pivoted at 14, an elbow-lever 15, the horizontal arm of which is jointedly attached at 16, to the upper end of an actuating bar 17. Jointedly attached at 18, is the upper enlarged end of a rod 19 which is extended downwardly through a bore in a stud 20, which serves as a guide therefor and is rigidly attached to the base-plate 5. The lower portion of the rod beneath the casing is enlarged as shown at 21, so as to form a shoulder for engaging the plate to limit the upward movement of the rod. A coiled spring 22, is interposed between the stud 20 and the shoulder at the upper end of the rod and serves to hold the rod in a normal position. A lever 23, has one end jointedly attached at 24 to the lower end of the actuating rod while the other end is attached in like manner at 25, to the lower end of a stud 26, which is rigidly attached to the bottom plate of the casing. The part 23 is passed loosely through a slot 27, in the standard 2, better shown in Figs. 1 and 2, and is jointedly connected at 28 to a bifurcated member 29, attached to the upper end of a rod 30, located within the standard 2, and having its lower end jointedly attached in a well known way to a treadle lever 31, Fig. 1, which is extended through a slot 32 in the pedestal 4, Fig. 1, and pivotally connected at 33 to bracket arms 34. It will thus be seen that by depressing the treadle, the bar 17 may be actuated against the pressure of the spring 19. For reasons hereinafter to be stated, it is essential that the bar 17 should be moved downwardly to its full limit before being allowed to return to its normal position. For this purpose, I provide the following described means: A rack 35, Figs. 2, 3 and 4, is formed upon the edge of the bar 17, the teeth of which are adapted to be engaged by one or the other of two detention pawls 36, 37, formed upon a member 38, which is pivoted at 39 to a horizontal arm 40, rigidly attached to the back-plate 10. The rear end of the member 38 is wedge-shaped and in position to engage the blunt wedge-shaped end of a horizontal pin 41 fitted loosely in a bore formed in a block 42, said pin being held in a normal position by means of a light coiled spring not shown, located within said bore. The part 38 is provided with an arm or forward extension 43, which is adapted to be engaged by one or the other of two pins 44, 45, according as the bar 17 is lowered or raised. The parts are shown in their respective normal positions in Figs. 2 and 3, the detent 37 being yieldingly held into engagement with a rack-tooth by the pressure of the spring actuated pin. The parts are adjusted with sufficient play to permit the detent to slide over the teeth as the bar 17 is moved downwardly, but in case the treadle is released before the full stroke is completed, the bar will be held by the detent against upward movement. When, however, the bar 17 is moved down until the pin 44 is brought into engagement with the extension 43, the nose of the part 38 will be moved to the upper side of the inclined face of the pin 41, thereby bringing the tooth 36 into action until the bar 17 is forced upwardly to its full limit when the part 38 will be restored to the position shown in Fig. 2, as a result of the contact between the pin 45 and the part 43. It will thus be seen that the bar 17 must be moved to its full limit in each direction before a reversal can occur, a feature which is essential to the successful operation of the separating, selecting and registering of different coins.

Loosely fitted between the frame-plates 9 and 10, and spaced apart by means of the filling members 12, are parallel horizontally arranged slide-bars 46, 47 and 48, respectively, the protruding ends of which are jointedly connected by means of pins 49, to an upright connecting bar 50. An elbow lever 51, corresponding to the lever 15, is pivotally supported at 52, upon an arm 53, Fig. 4, rigidly attached to the plate 10. The extended arm of the lever 51 is provided with a pin 54, which is extended through a vertical slot 55, Figs. 2 and 3, in the bar 17. The depending arms of the levers 15 and 51, respectively, are provided with slots 56, 56, Fig. 4, for engagement with the pin 49, for the purpose of actuating the bar 50, for moving the slide-bars 46, 47 and 48.

Pivoted upon the stud or bearing 52, Fig. 4, is a lever 57, having a slot 58 therein through which is projected a stud 59, rigidly attached to the depending arm of lever 15, for actuating the lever 57, when the lever 15 is moved. A bracket 60, Fig. 4, has its vertical portion rigidly attached to the upper part of the plate 10, its horizontal portion 61, being flush with the upper edge of said plate and serving as a support for a horizontal frame-plate 62, also shown in Figs. 2, 3, 9 and 10. The plate 62 is channeled for the reception of a flat elongated coin-separating plate 63, which is slidably fitted in the channel in the plate 62, and housed therein by means of a top-plate 64. One end of the coin-separating plate is arranged to protrude from the housing and is provided with a slot 65, through which is projected the free end of the lever 57.

beyond the right-hand end wall into the coin-chute 77, as shown at 85, in Fig. 3, the extent of said projection being successively increased from the topmost slide downwardly, so that the relative distance between the opposing ends of coacting slides may conform to the relative diameters of the different coins to be selected from the greatest to the least. For example, the distance between the opposing ends of the slides 46 and 82, would represent the diameter of a nickel which coin 86, would be arrested when dropped into the slot and held in the position shown in Fig. 3. A cent 87, of lesser diameter would pass the slides 46, 82, and be arrested in like manner between the opposing ends of the slides 47 and 83. In the same way, a dime 88 would pass both of said sets of slides and lodge between the ends of the slides 48 and 84.

Each of the slides 46, 47 and 48 has a connecting plate 90, Figs. 2, 3, 5, 6, 7, 10 and 11, formed thereon or rigidly attached to the front face thereof by means of rivets 91, the face plate 9, being recessed as better shown at 92, Figs. 5 and 6, for the reception of said connecting plates. A slot 93 is formed in each of the plates 90, into which is projected a stud 94, rigidly attached to the slide members 82, 83 and 84.

Each of the members 90, have rigidly attached thereto a boss 95, recessed to receive a sliding pin generally designated by 96, which I term the "knock-out pin", the head of which is rounded or beveled, as shown, and is adapted to project forwardly through an opening in said boss; a shoulder 97 serves to limit its outward movement. The stem 98 of said pin is passed loosely through a plug 99, and its inner end is normally flush with the inner face of the plate 90. A coiled spring 100, interposed between the shoulder 97 and the plug 99, serves to hold said pin in the normal position indicated in Figs. 5, 10, 11 and 13. The bosses 95 are adapted to be moved horizontally with the several sliding parts to which they are attached, and in order to provide for such movement, slots 101, Figs. 2, 5, 6, 10, 11 and 13, are formed in the front plate 9. Rigidly attached to said front plate by means of screws 102, Fig. 2, is a trip block or cam member, generally designated by 103, which is provided with forwardly extended portions 104, also shown in Figs. 5 and 6, which extended portions lie respectively in the paths of movement of the knock-out-pins 96. Each of said extensions is provided with an inclined or beveled portion 105, Figs. 5 and 6, in position to engage the head of the pin in the path of which it lies and force said pin inwardly, as shown in Fig. 6, when the selecting slide to which said pin is attached is moved to its extreme abnormal position, the purpose and result of which movement will be explained later. Inasmuch as each of the knock-out-pins is actuated with each movement of the treadle, in order to avoid conflict between them and the slides 82, 83 or 84, when a coin is not present, I provide a slot 106, Figs. 3, 5, 6 and 7, in each of said last named slides so that said knock-out-pin may pass therein without interference with the registering slide.

In Fig. 5, I have shown a coin 87, in position to cause registration. That is to say, when the slide 47 is actuated its inner end is caused to press against the edge of the coin which latter, in turn, is pressed against the inner end of the slide 83, thereby removing it to an abnormal position to actuate a registering mechanism as hereinafter explained. Upon reaching the full limit of the slide movement, the knock-out-pin is actuated so as to push the coin sidewise out of the position shown in Fig. 5 to a position indicated in dotted lines, in Fig. 6, thereby causing it to fall into a predetermined chute for conveying it to a given compartment in a coin box. The chutes for this purpose will now be described.

Formed in the backing-plate 10, upon the respective levels of the selecting slides and opposite the vertical coin-chute, are openings 107, Figs. 3, 4, 5, 6, 11 and 13, to permit a coin to be moved from the vertical plane of the selecting slide, as shown in Fig. 5, to that indicated in dotted lines in Fig. 6. Said coin openings respectively, are in communication with divergent coin chutes, the topmost one being in communication with a chute 108, Figs. 4, 5, 6, and 11, which chute is stamped from sheet metal and attached by means of screws 109, Fig. 4, to the back-plate 10, and inclined downwardly toward the right, as viewed from the rear, to a level near the lower edge of the plate. A second chute 110 is constructed and attached in like manner to the back-plate, but inclined in an opposite direction, as shown in Figs. 4, 5 and 6. Said chute leads from the second or middle opening downwardly to the same level. A third chute 111, Figs. 4 and 13, is arranged vertically and leads downwardly to a corresponding level. The chutes 108, 110 and 111, are provided, respectively, at their lower ends with downwardly and forwardly inclined portions 112, 113 and 114, Figs. 2, 3, and 4; the part 114 being also shown in Fig. 13. Side flanges 115, are formed upon said extended portions for guiding the coins.

A coin receptacle or drawer, generally designated by 116, Figs. 1, 2, 3, 4 and 13, is slidably fitted within the casing and adapted to be secured by means of a lock 117. Said drawer is provided with a concave bottom and is divided into separate compartments for the reception of the different coins, by means of partitions 118. In order to pre- A coin receiving hopper, generally designated by 65ª, Figs. 1, 2, 3, 4, 8, 9, 10 and 12, which is extended above the casing, has an annular base portion 66, which is rigidly attached to the top of the housing plate 64. A cylindrical glass tube 67 is inclosed at the base within the part 66, and above by means of spaced upright standards 68, which serve as supports for the main hopper while providing space through which to view the glass tube. Extending upwardly above the tube 67, which may be designated as the "sight tube", is a hollow cylindrical portion 68ª having an integral closed top 68ᵇ. A portion of the wall of the cylindrical portion 68ª, is cut away upon one side as shown at 68ᶜ, Fig. 12, and upon the side of said opening or cut-away portion is formed a lateral extension 68ᵈ open at the top and having the primary hopper 68ᵉ with the usual flaring walls formed thereon and extending upwardly therefrom. The interior part 68ᵈ is cylindrical and has a diameter sufficient to receive the largest coin adapted to be manipulated by the machine. An inclined portion 68ᶠ is provided in said lateral extension, which commences upon a level with the upper part of the cut-away portion or opening 68ᶜ and extends downwardly a short distance into the upper portion of the sight tube 67, as shown at 68ᵍ, Fig. 12. This construction enables all coins deposited in the hopper to descend into the sight-tube while preventing their withdrawal from above.

The inner diameter of the sight-tube 67 should be such as to freely receive a nickel, which, in the example illustrated, would be the largest coin contemplated for use. The separating slide 63 is slightly wider than the inner diameter of the tube 67, as shown in Fig. 8, and when in its normal position, its forward end extends substantially to the point shown in Fig. 9 and indicated in dotted lines in Fig. 8, so that a coin dropped into the tube will lie upon the bottom plate 62, in position to be advanced flatwise upon said plate when the slide 63 is actuated by the movement of the lever 57, as hereinafter described. That portion of the slide 63, which is intended to pass beneath the cylinder 67, is made thinner than the remaining portion as shown at 69, Fig. 9, for the purpose of guarding against the unwarranted passage of abnormally thin or worn coins, and when in its advanced position, the end of the slide is flush with the end 70, Figs. 8 and 9 of the bottom plate 62. An L-shaped extension 71, also shown in Fig. 10, is made integral with the bottom plate 62, being cut away in a line flush with the rear edge of the coin channel so as to serve as a support for the upper edge of an inclined coin-chute 72, also shown in Figs. 2, 3 and 4, which has its rear upper portion attached by means of screws or rivets 73, to the under face of the part 71. A flat spring 74, is attached to the end portion of the part 71, and lies in a plane immediately above and parallel with that of the thin portion 69 of the slide 63 as better shown in Figs. 9 and 10. The free end of said spring lies beneath the right-hand wall of the cylinder 67, and is slightly bent upwardly as shown at 75, Fig. 9, so that the lowermost coin lying between it and the end of the movable slide will be moved forward beneath the spring when the separating slide is actuated, thereby slightly lifting the spring which forms a stop to prevent the passage of any coin which may lie upon the lowermost one. It will thus be seen that separation of coins of varying thickness, such for example, as nickels and dimes, may be insured and this even though they may be so worn as to be abnormally thin. The pitch of the inclined portion of the coin chute 72 is increased to a nearly vertical plane as shown at 76, Fig. 10, and is attached to the frame-plate 10 with the inner face of which it is made flush, so as to bring it into direct communication with a vertical coin-chute 77, Figs. 3, 5, 6 and 10, formed between the frame-plates 9 and 10, by cutting away portions of the spacing members 12, as more clearly shown in said Fig. 3. In order to avoid confusion, it should be noted that in Fig. 10, the reference numerals 12 and 77 appear to lead to the same part. This apparent inconsistency may be reconciled when it is remembered that the former is intended to indicate the end of the filling or spacing member and the latter the coin-chute of which the end of said spacing member forms one wall. A front wall 78, Figs. 2, 8 and 10, is provided as a part of the coin-chute 72, said wall being drawn inwardly to coincide with that of the coin-chute 77, and being provided with a depending flange 79, which is attached by means of a screw 80 to the plate 9.

The slides 46, 47 and 48 are intended, in conjunction with certain coacting parts, to serve as selecting members for coins of different denominations; the upper edge of the inner ends of said slides being normally flush with the corresponding ends of the spacing members as clearly shown in Fig. 3. A portion, however, of the inner end of each of said selecting slides is inclined at an angle to the plane of the vertical, as shown at 81, Figs. 3, 5, 6 and 7, for the purpose of temporarily holding a coin of predetermined diameter between said end and a coacting member to be mentioned, in order to utilize said coin as a factor in actuating registering mechanism. Located between the plates 9 and 10 in the same vertical plane, with the slides 46, 47 and 48, are slides 82, 83 and 84, respectively, of the same height and thickness. The inner ends of said slides are arranged to project slightly vent the drawer from being fully withdrawn and removed from the case when unlocked, I provide the following stop mechanism: Parallel, vertical guide-flanges 119, Figs. 2, 3 and 4, are rigidly attached to the bottom plate of the casing, having raised portions 120, Fig. 4, near their forward ends adapted to engage laterally extended studs 121 and forms stops therefor. For the purpose of arresting the coins and permitting their temporary display before their final deposit in the coin receptacle, I provide the following mechanism: Journaled in bearings in brackets 122, Figs. 2, 3 and 4, is a horizontally arranged rock-shaft 123, also shown in section in Fig. 13. A crank-arm 124, Figs. 3 and 4, is rigidly attached to the end of said shaft, and has its end jointedly connected by means of a link 125, to the laterally extended arm of the elbow lever 51. Trays 126, 127 and 128, respectively, of like construction, are rigidly attached to said rock-shaft so as to normally hang downwardly therefrom in the manner best shown in Fig. 13. Openings 129, Figs. 1 and 13 are formed in the front wall of the casing opposite said respective trays and shields having side walls 130, and rearwardly and downwardly inclined top walls 131, are extended inwardly from the top and sides of said openings while shorter and downwardly inclined shields 132, Fig. 13, are extended inwardly from the lower edges of said openings. When the treadle is depressed the coin display trays are, through the action of the rock-shaft, caused to be tilted to the position indicated in dotted lines in Fig. 13, with the bottom in contact with or in close proximity to the shields or flanges 132. When, therefore, a coin is discharged from any one of the chutes 108, 110 or 111, it falls upon the corresponding tray where it is held in plain view in front of the opening 129 until the treadle is released which permits it to enter the coin receptacle.

Having described the various means for receiving, separating, selecting, displaying and depositing the various coins in separate coin receptacles, it remains to describe the coin registering mechanism. Assuming a coin to have been deposited in the hopper, the first downward movement of the treadle causes it to be transferred by the movement of the slide 63 to the chute 72 where it falls into the main vertical chute 77. Inasmuch, however, as the slide 46 is then in an abnormal position, so as to temporarily close said chute, the coin is caused to rest upon its upper edge until the treadle is released and the slide restored to its normal position, when the coin will be free to descend by gravity until it reaches the position where it should be arrested. Assuming the coin to be a nickel, its diameter would be such as to cause its arrest between the ends of the slides 46 and 82, as shown at 86, in Fig. 3. The coin being thus interposed between the slides, a second depression of the treadle would cause the slide 82, always idle in the absence of a coin, to be actuated. Each of the three register actuating slides is caused to extend beyond the edge of the frame-plates 9 and 10, as clearly shown in Figs. 2 and 3; said extended portions being thickened to form shoulders 133, Figs. 5, 6 and 7, to abut against the end of the plate 10 for limiting the inward movement of said slides. The slide 82, is provided with a depending lug 134, Figs. 3 and 4, upon its outer end, having a stud 135, and adapted to engage a slot 136, Fig. 2, in the lower end of a lever 137, pivoted at 138, to a bracket 139, rigidly attached to the frame-plate 9. Rigidly attached to the frame-plate 10, is a bracket 140, Figs. 2, 3 and 4, upon the horizontal portion of which is mounted a U-shaped counter supporting frame 141, provided with the usual shaft 142, having thereon the usual numbering disks or counter-wheels 143, also shown in Figs. 14, 15 and 16. Rigidly attached to the shaft 142 is an actuating arm 144, which is in the same plane with the lever-arm 137. The latter is arranged to stand normally near to but out of contact therewith, as shown in Fig. 4, and indicated in dotted lines in Fig. 14. The end of the lever 137, which is adapted to engage said arm 144, is preferably rounded as shown at 145, while the contacting portion of said arm is also rounded as shown at 146. Riveted to or formed upon the front face of the lower end of said arm is a plate or extension 147, better shown in Figs. 2 and 3, having a stud 148 thereon adapted to engage a slot 149 in the upper end of a lever 150, better shown in Fig. 2, which is pivoted to a stud 151, upon the frame-plate. A slot 152, in the lower end of said lever is adapted to receive a stud 153 attached to the lowermost slide 84. The first of the series of counter wheels is provided with retaining pawls 154, 155, Figs. 14, 15 and 16, connected by a controlling spring 156 and a detent pawl 157, held in engagement with a ratchet wheel 158, by means of a spring 159, all of which counter mechanism is well known.

From what has been stated it will be seen that the counter mechanism described is adapted to be actuated either by the registering slide 82 or 84, the former of which represents nickels and the latter dimes. The extent of movement imparted by the lever 137 to the arm 144, is half that caused by the movement of the lever 150, and when the latter is moved, the lever 137 remains at rest, being disconnected from said arm. When, however, the arm is actuated by the movement of the lever 137, the lever 150, is also moved a corresponding distance; but inasmuch as but one coin is selected at a time or by a given movement of the treadle, there would be no coin in position in the lowermost slide and hence such slight movement of the slide 84, would have no effect upon the final result. The counters described stand for a five cent unit and hence when a nickel is deposited the ratchet wheel 158 will be rotated one notch through the action of the lever 137, but when a dime is deposited, said wheel will be moved two notches; thus registering two units. The numbers on the registering disks are positioned as usual, to conform to the relative positions of the ratchet-wheel teeth, and may be viewed through openings in a plate 160, Figs. 1, 2, 3 and 4, in the case. Mounted upon the bracket 140, is also a registering mechanism for registering cents, generally designated by 161, the counters of which are disposed upon a shaft 162, in the usual way and are observable through openings in a plate 163, in the casing. An actuating arm 164, is rigidly attached to the shaft 162, its free end being jointedly connected at 165, to a pitman 166, which has its opposite end jointedly connected at 167, to the outer end of the registering slide 83.

My machine as a whole, comprises different mechanisms for the several purposes of separation, selection, registration and inspection of coins and hence capable, *per se*, of possible separate and independent use; but inasmuch as the device is especially intended for use upon street railways and for analogous purposes in which it is essential, in order to guard against fraud and error of judgment and manipulation to cause coins to be automatically separated, selected, registered and deposited in a sealed or locked compartment and also subjected to inspection immediately before such deposit and after such registration and all during a given cycle of operation, I have so combined and connected said mechanisms that one serves to modify or control the action of another in producing a new and improved unitary result. For example, the coin separating mechanism is so connected, with and controlled by that for denominational selection, that a coin may, during a part of a given cycle of operation, be automatically separated by the separating device, moved in unison with, and held in a predetermined position by an element of the selecting mechanism until the latter shall have caused the discharge therefrom of a previously inserted coin; after which the completion of the cycle of the selecting members will permit the separated coin to be received by said selecting mechanism ready to be discharged during the succeeding cycle; and, inasmuch as it is important that each coin may be inspected, and possibly removed, if spurious, before deposit, it follows that it should, previous to such inspection, be automatically registered, so as to prevent fraudulent manipulation by the attendant, and that in the same part of the cycle in which it is caused to be discharged from the selecting means and before the completion of the cycle of a given operation. It is obvious that an attendant against whom a coin has been previously charged as a result of registration, could have no object in abstracting it, while he would be free to protect himself should the coin prove spurious, by insisting upon its redemption by the passenger. The coin separation described, being controlled in the order of its operation, by the selecting mechanism, serves to avoid confusion, uncertainty of registration and obstruction of the device by insuring the admission to the selecting mechanism of but one coin at a time and that only when the latter is in its normal position.

An important advantage of my improved device is that by providing means whereby the primary actuator must be moved to its full limit in each direction before reversal can occur, dishonest manipulation of the selecting mechanism may be prevented and accuracy of selection as well as registration insured.

Having thus described my invention, I claim:

1. A device of the class described, comprising in combination primary and secondary coin receivers, the former being arranged to hold coins flatwise, coin ejecting means for consecutively ejecting coins from the former and moving them to an inclined chute leading to the latter, an inclined chute in operative proximity to said ejecting means for tilting a coin from a horizontal to a vertical plane and delivering it to the entrance of a selecting-chute, slidable selecting means located in the plane of said selecting-chute, said means serving, when in an abnormal position, to close said selecting-chute, a registering slide for each distinctive coin to be actuated by a coin held between its end and said slidable selecting means, registering means in operative connection with said registering slides, a selecting-coin-chute located between said slidable selecting means and the adjacent ends of said registering slides, means common to said coin-ejecting and slidable selecting means for moving them in unison, separate coin-chutes leading to separate compartments from the respective levels of said registering slides, the inlet openings thereto being arranged to register with coins when advanced to the full limit of movement of said slidable selecting means, laterally movable coin ejectors and positive means for actuating the same when a coin is in registration with an opening leading to a discharge coin-chute.

2. A device of the class described, comprising, in combination, primary and secondary coin-receivers, the former being adapted to hold coins flat-wise, coin ejecting means for consecutively ejecting coins from the former and moving them to an inclined chute leading to the latter, an inclined chute in operative proximity to said ejecting means for tilting a coin from a horizontal to a vertical plane and delivering it to the entrance of a selecting-chute, slidable selecting means located in the plane of said selecting-chute, said means serving, when in an abnormal position, to close said selecting-chute, a registering slide for each distinctive coin to be actuated by a coin held between its end and said slidable selecting means, registering means in operative connection with said registering slides, a selecting coin-chute located between said slidable selecting means and the adjacent ends of said registering slides, means common to said coin ejecting and slidable selecting means for moving them in unison, separate coin-chutes leading to separate compartments from the respective levels of said registering slides, the inlet openings thereto being arranged to register with coins when advanced to the full limit of movement of said slidable selecting means, laterally movable coin ejectors, positive means for actuating the same when a coin is in registration with an opening leading to a discharge coin-chute, and means in connection with said slidable selecting means for returning said registering slides to normal position after registration.

3. A device of the class described, comprising, in combination, a coin-chute located in a vertical plane, means for admitting a coin thereto with each successive cycle in the operation of the machine, slidable coin moving means located in the plane of said coin-chute, the movement of which, from its normal position, serves to close said coin-chute and to advance a coin to a registering position, primary actuating means for actuating said coin moving means, registering slides, one for each distinctive coin, located in the path of said slidable coin-moving means, the distances between the ends of which and said coin-moving means are varied to conform to the relative diameters of different coins to arrest given coins between them, registering means in operative connection with said respective slides and means in operative connection with said actuating means for preventing a reverse movement of the latter in either direction until the stroke is carried to its full limit.

4. A device of the class described, comprising, in combination, a coin-chute located in a vertical plane, means for introducing a coin thereto with each operative cycle of the machine, coin moving means located in the plane of said coin-chute, the movement of which, from its normal position, serves to close said coin-chute and to advance a coin therein to a registering position, primary actuating means for actuating said coin-moving means, registering slides, one for each distinctive coin, located in the path of said slidable coin-moving means, the distance between the end of a given registering slide and said coin-moving means, corresponding to the diameter of the specific coin to be registered thereby, so as to support said coin between them, registering means in operative connection with said respective slides, means controlled by said actuating means for positively moving said coin laterally after registration, to discharge it into a closed receptacle and means in operative connection with said actuating means for preventing a reverse movement of the latter in either direction until after the completion of a full stroke.

5. A device of the class described, comprising, in combination, a coin-chute located in a vertical plane, means for admitting a coin thereto with each operative cycle of the machine, slidable coin-moving means located in the plane of said coin-chute, the movement of which, from its normal position, shall cause the closing of said coin-chute against the admission of a new coin and the simultaneous advancement of one therein to a registering position, primary actuating means for actuating said coin-moving means, registering slides, one for each distinctive coin, located in the path of said slidable coin-moving means, the distance between the end of a given registering slide and said coin-moving means corresponding to the diameter of a specific coin to be registered thereby, so as to support said coin between them, registering means in operative connection with said respective registering slides, knock-out means connected with said coin-moving means for discharging a coin to a closed receptacle when in registration with a discharge opening, positive means for engaging said knock-out means at a predetermined point in its travel and means in operative connection with said actuating means for insuring a full stroke of the latter in both directions.

6. A device of the class described, comprising, in combination, primary and secondary coin receivers, means for consecutively ejecting coins from said primary receiver and moving them to a coin selecting chute, a selecting slide for each distinctive coin, one of said slides serving when in an abnormal position, to close said selecting chute, a registering slide for each selecting slide to be actuated only when a coin is selected by and held between the adjacent ends of the two, a selecting coin-chute located between the adjacent ends of said selecting and registering slides, means for actuating said ejecting and selecting slides in unison, registering means independently connected with each registering slide, means for discharging a coin from any one of said selecting slides after registration into a chute leading to said secondary receiver and means interposed in the path of said last named chute for arresting displaying and permitting the substitution of a coin while said actuating means is in an abnormal position and for discharging a coin into said receptacle when said actuating means is reversed whereby a spurious or defective coin may be first registered for its face value and a genuine one substituted therefor and deposited in said secondary respectacle.

7. A device of the class described, comprising, in combination, primary and secondary coin receivers, means for consecutively ejecting coins from said primary receiver and moving them to a coin selecting chute, a selecting slide for each distinctive coin, one of said slides serving, when in an abnormal position, to close said selecting chute, a registering slide for each selecting slide to be actuated only when a coin is selected by and held between the adjacent ends of the two, a selecting coin-chute located between the adjacent ends of said selecting and registering slides, means for actuating said selecting and ejecting slides in unison, links having longitudinal slots therein rigidly attached to said selecting slides, pins upon said registering slides in loose engagement with said slots, knock-out pins supported in said links, at right angles to the plane of said slides, springs for holding the same in normal positions respectively, and stationary means for engaging said pins when said selecting slides are in extreme abnormal positions to actuate said pins to discharge coins, and registering means in operative connection with said registering slides.

8. A device of the class described, comprising, in combination, primary and secondary coin receivers, a coin selecting chute leading from said primary receiver to coin selecting means, coin-selecting means in operative relation to said chute, intervening coin ejecting means for advancing a coin from said primary receiver to said selecting chute, actuating means for simultaneously moving said ejecting and selecting means to predetermined abnormal and back to normal positions, said selecting means when in an abnormal position, serving to close said coin-chute, registering means adapted to be actuated by said selecting means during the movement of the latter to an abnormal position, means for ejecting a coin from said selecting means after registration and delivering it to a chute, a coin-chute leading from said ejecting source to said secondary receiver, said coin chute leading past an opening adapted to permit the inspection and possible withdrawal of a coin when held opposite said opening and means controlled by said actuating means for arresting a coin while opposite to said opening holding it at the will of the operator for inspection or replacement and releasing it upon the return of said actuating means to a normal position.

In testimony whereof, I have signed this specification in the presence of two subscribing witnesses, this eighth day of June, 1915.

FRANK G. MURRAY.

Witnesses:
DAVID H. FLETCHER,
JENNIE L. FISKE.

Copies of this patent may be obtained for five cents each, by addressing the "Commissioner of Patents, Washington, D. C."